(12) United States Patent
Zakiewicz

(10) Patent No.: US 8,020,382 B1
(45) Date of Patent: Sep. 20, 2011

(54) CLOSED LOOP, HOT DRY ROCK HEAT RECOVERY PROCESS

(75) Inventor: Bohdan Zakiewicz, Santa Monica, CA (US)

(73) Assignee: Geothermic Solution LLC

( * ) Notice: Subject to any disclaimer, the term of this patent is extended or adjusted under 35 U.S.C. 154(b) by 469 days.

(21) Appl. No.: 12/342,431

(22) Filed: Dec. 23, 2008

(51) Int. Cl.
*F03G 7/00* (2006.01)

(52) U.S. Cl. .................................... 60/641.2

(58) Field of Classification Search ....... 60/641.2–641.4
See application file for complete search history.

(56) References Cited

U.S. PATENT DOCUMENTS

| | | | | |
|---|---|---|---|---|
| 4,043,129 A * | 8/1977 | McCabe et al. | ............. | 60/641.2 |
| 4,044,830 A * | 8/1977 | Van Huisen | ................. | 166/267 |
| 4,201,060 A * | 5/1980 | Outmans | ...................... | 60/641.2 |
| 4,760,705 A * | 8/1988 | Yogev et al. | .................... | 60/651 |
| 4,776,169 A * | 10/1988 | Coles, Jr. | ..................... | 60/641.2 |
| 5,911,684 A * | 6/1999 | Shnell | ............. | 60/641.2 |
| 6,679,326 B2 * | 1/2004 | Zakiewicz | ................ | 166/272.5 |
| 7,225,621 B2 * | 6/2007 | Zimron et al. | .................. | 60/651 |
| 7,251,938 B1 * | 8/2007 | Bond | ........................... | 60/641.2 |

* cited by examiner

*Primary Examiner* — Hoang M Nguyen

(57) ABSTRACT

The present invention is a closed loop system of heat recovery in hot dry rock or in water-containing formations for generation of electrical power. Recovery of heat from such formations is accomplished by way of multiple horizontal levels of generally radially drilled bores from a central shaft. Heat transfer is accomplished either by way of terminal end heat exchangers or by way of heat transfer to conduits extending from the central shaft.

15 Claims, 3 Drawing Sheets

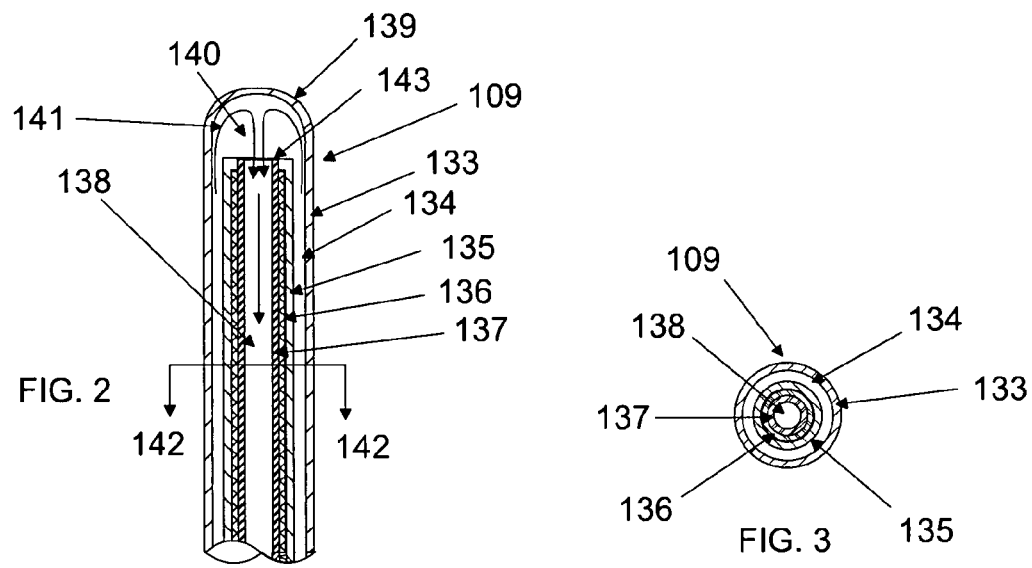
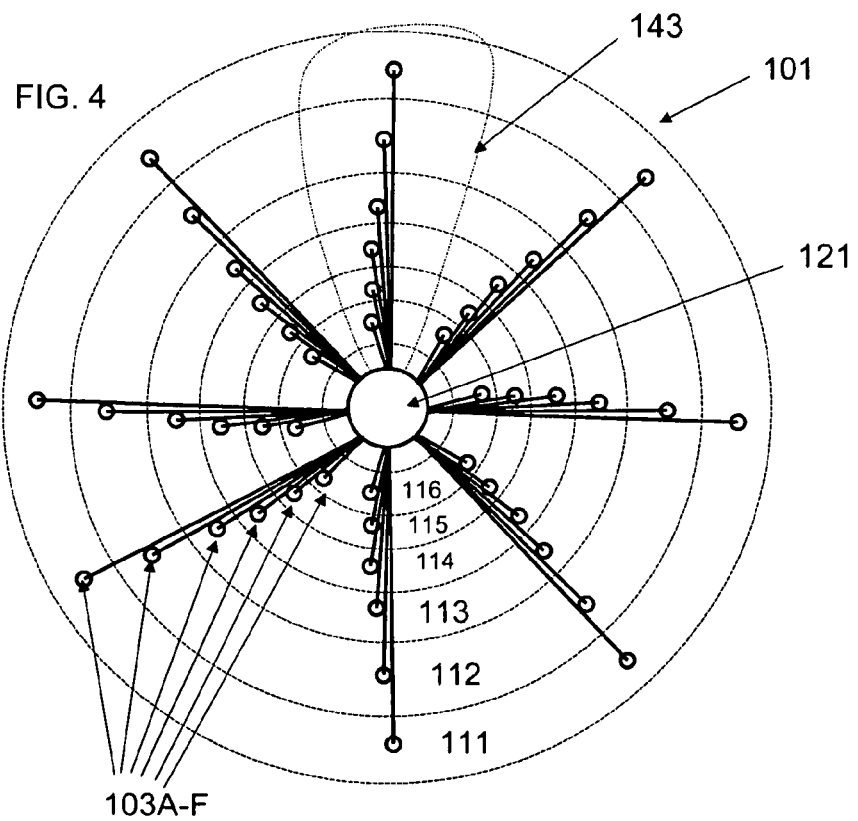

CLOSED LOOP, HOT DRY ROCK HEAT RECOVERY PROCESS

FIELD OF THE INVENTION

The present invention relates to a closed loop, hot dry rock system of heat recovery from geological formations for production of other forms of energy.

BACKGROUND OF THE INVENTION

Recovery of heat from underground resources is currently commercially practiced in one of three main technological areas, i.e., power plants using dry steam, flash steam, and binary systems. Factors controlling selection of one of these technologies for a selected site include temperature, depth, and quality of the water and steam in the area. In all these cases, condensed steam and/or geothermal fluid is injected back into the ground to recover heat. In some locations, a natural supply of water produces steam from magma deposits is exhausted and processed waste water may be injected to replenish the supply.

A disadvantage with current, installed technology for geothermal heat recovery in that many geothermal are operated with excessive injection of fluids to recover the heat and thereby cool the resource. Conservative management to avoid such a result results in a failure to recover substantial heat resources. Current, installed technologies suffer a further disadvantage, in that injection of fluids, both liquid and gas, into the geological formation necessarily disrupts to a greater or lesser degree the structure of the formation. The disruption can result in surface subsidence and/or a severe re-structuring of the formation in a manner that impairs the heat resource.

Therefore, current, installed technologies substantially endanger the heat resource they attempt to recover. Notwithstanding their disadvantages, a brief description is made of the three geothermal heat recovery listed above. A dry steam power plant uses an underground resource where dry steam, without entrained water droplets, is obtained and delivered at above 235° C. (455° F.) to a surface steam turbine to produce electricity. In contrast, a flash steam power plant delivers to surface process equipment hot liquid water above 182° C. (360° F.). Liquid water is flashed into a vessel, where flashed steam is delivered to a steam turbine to produce electricity. Binary-cycle power plants recover liquid water at from 107 to 182° C. (225-360° F.) at a surface facility to indirectly transfer heat in heat exchangers to iso-butane or iso-pentane, which are vaporized and power a turbine.

A fourth technology has not been extensively practiced, in that the depth at which geothermal heat is recovered exceeds those of the above technologies. Hot dry rock systems (1) locate terminal end heat exchanger in a geological formation connected with a closed loop with a heat recovery liquid or (2) inject liquid water into the formation and recover steam in the same or different conduits. A hot dry rock system has many advantages over the others, as it can be used anywhere, not just in tectonically active regions with sufficient water present in the formation.

Of the above technologies for recovering heat from a geological formation, only one will not potentially adversely affect land stability in the surrounding region and/or cause damage to the geological formation. The closed loop, hot dry rock system is the only technology which does not continuously inject liquids into the formation, liquids which explosively expand on introduction into the formation. Such continuous and violent expansion of gases in the vicinity of injection conduits can result in damage to natural flow paths of gases within the formation, potentially closing off wells drilled to recover the vaporized liquids. The use of a closed loop, hot dry rock system necessarily results in a longer-lived and more easily managed heat resource than the other technologies described above.

Thus, there is a need for a closed loop, hot dry rock system which is economically competitive with other technologies and which obtains the substantial benefits of geothermal heat recovery without injection of liquid or gases into the geological formation containing the heat resource. Geothermal formations can provide heat for many decades but using injection-dependent heat recovery technologies can eventually cause a geological formation to cool down to temperatures below which energy production is no longer feasible. This may mean that a specific geothermal location can undergo depletion. Predictive calculations for depletion of heat from a specific location are not presently absolutely accurate, meaning that recovery of investment using injection technologies is necessarily more risky that using a more controllable and predictable closed loop, hot dry rock system.

A key characteristic of a hot dry rock system is that it may often require drilling to at least 10 km. Current drilling technology has improved so that reaching this depth is now routine for the oil industry. Exxon has produced an 11 km production well at the Chayvo field in Sakhalin, Russia.

Some geothermal power plant capital costs are generally constant regardless of the technology and include the cost of land and physical plant, including buildings and power-generating turbines. Resistance to installation of closed loop, hot dry rock systems has been based primarily on an installed cost of prior art devices and equipment to reach deeper geological formations. A closed loop, hot dry rock system which reduces such aspects as pipe diameters and conduit cost per unit length can dramatically affect the overall cost of the project, considering the depths which will be typically reached by the terminal end heat exchangers of the system. There is a need for such improvements. Geothermal power plant lifetimes are typically over thirty years, wherein cost recovery is planned for the first fifteen years of operation. However, those metrics in the near future will change dramatically where energy costs appear to have no upper limit and where energy usage for most of the world's population is predicted to expand to many times the current levels. Even now, there is a strain on our ability to deliver such energy. A closed loop, hot dry rock system incorporating the present invention can become the technology of choice in those circumstances.

"Model estimates demonstrate that a HDR system has to produce a thermal capacity of 10 to 100 megawatts over a period of at least 20 years to be economical. Such size of a system requires heat exchange surfaces of 3 to 10 square kilometers and circulation rates of 50 to 100 liters per second. The critical fluid pressure for subsurface system operation is a function of the stress field at a depth which varies from site to site. For a HDR reservoir of a depth of 5 kilometers, the minimum pumping pressure required is about 40 megapascals. In addition, economics limit the operation pressure. Today it is estimated that the flow impedance in a HDR system (the difference between inlet and outlet pressure divided by the flow rate at the outlet) should be in the range of 0.1 megapascal-seconds per liter (MPa s/L)." (DEVELOPMENT OF HOT DRY ROCK TECHNOLOGY; Tenzer, Helmut; GHC BULLETIN, DECEMBER 2001; pp. 14-22). In U.S. Pat. No. 4,044,830, a model of a radial system of horizontal bores are made to accommodate a number of terminal end heat exchangers for a hot dry rock geothermal recovery system. A specific example describes 15 megawatt production by way of surface level steam at 320 psia and 423 degrees F., returning liquid water at 125 degrees F. The disclosure of the '830 patent is incorporated herein. U.S. Pat. No. 6,679,326 discloses an open loop system of water injection and recovery for steam generation.

The above two examples of hot dry rock geothermal systems are among many describing the prior art challenges to providing a cost-efficient and compact installation. There is a need for such an installation.

SUMMARY OF THE INVENTION

The present invention is a closed loop system of heat recovery in hot dry rock or in water-containing formations for generation of electrical power. Recovery of heat from such formations is accomplished by way of multiple horizontal levels of radially drilled bores from a central shaft. Heat transfer is accomplished either by way of terminal end heat exchangers or by way of heat transfer to conduits extending from the central shaft.

Generally flattened and cylindrical heat recover levels are adjacent to each other and absorb heat from the formation at decreasing average temperatures in moving from a lowest level to a highest level. These average temperatures are inferred from calculated heat recovery from the level; i.e., heat recovery from a formation is controlled by injection flow rates of heat recovery fluid to the level. Heat recovery fluid may by water or other fluid known in the prior art for heat recovery in hot dry rock systems. Dry steam, flash steam and binary heat recovery systems are capable of being used with the invention system of multi-level heat recovery from a formation.

Levels of heat recovery in formations in the invention system are preferably adjacent but may be effectively separated so that heat recovery in one level does not affect heat recovery in another level.

The invention system of adjacent heat recovery levels comprises cylindrical, downward frustro-conical or upward frustro-conical overall heat recovery zones. Each of these shapes is provided for more efficient recovery of heat and preservation of average formation temperatures in the heat recovery levels for specific types of formations.

The invention system also comprises feedback means for regulating flow of heat recovery levels so that a desired maximum sustainable average temperature is obtained from the heat recovery level. Excessive withdrawal of heat from a heat recovery level will result in reduction of average temperature in that level and consequent reduction in heat recovery. If such cooling occurs in a heat recovery level, it affects the heat recovery from adjacent heat recovery levels and will eventually disrupt the overall production of electricity from heat recovered in the formation. Flow rate, temperature and pressure sensors for the heat transfer fluid are provided for injected and recovered fluid, from which information an average temperature of the formation is determined. During startup of the system, flow rates to the heat recovery levels are slowly increased in steps to determine that a specific flow rate results in a stable and relatively unchanging average temperature in the formation and which returns to a mixed heated recovery vapor drum a desired temperature and pressure of the heated recovery vapor. Preferably, a lowest heat recovery level receives a highest flow rate of heat recovery fluid with a lower rate in adjacent levels above that lowest level. A highest permissible flow rate of heat transfer fluid to each heat recovery level is determined for each installed system, which becomes a maximum flow setpoint for flow of heat recovery fluid to the heat recovery level. Detection that an average temperature of a heat recovery level has decreased by a predetermined amount causes a control system to reduce flows of heat recovery fluid to the heat recovery levels by a predetermined amount. Preservation of a formation average temperature is critical to operation of an electrical power generation system which must operate for decades.

In formations where a lower temperature range is found, an upward frustro-conical heat recovery zone is preferred, in that a largest lowest heat recovery level absorbs heat at a highest average temperature while drilling costs are reduced for higher levels which will absorb lower temperature heat but which is still valuable in contributing to an overall heat recovery from the formation. In formations where extremely high temperatures are found, i.e., those approaching 300 degrees C., a downward frustro-conical heat recovery zone is preferred, in that adjacent level structuring of the heat recovery levels results in exposure of only terminal ends of each horizontal bore and conduit to the highest temperatures, which are potentially damaging to heat transfer surfaces and conduits.

The object of the invention is to provide a multi-level heat transfer system for recovery of geothermal heat from a formation.

A further object of the invention is to provide a regulated process for a radially drilled closed loop heat recovery system in hot dry rock to preserve an average formation temperature by control of heat transfer fluid into the formation.

Yet a further object of the invention is to provide heat recovery zones comprising multiple closed loop and adjacent heat recovery zones in the shape of a cylinder, an upward frustro-conical section or a downward frustro-conical section.

Yet another object of the invention is to provide a system which maximizes heat recovered in hot dry rock geothermal systems by increasing heat recovery volume in a formation at a single well or shaft.

Yet another object of the invention is to transfer heat to a number of terminal heat exchangers in a closed loop, hot dry rock geothermal system, where each of the heat exchangers are aligned along a radial path extending from a central shaft. Alternately, transfer of geothermal heat is made through a conduit in a closed loop, hot dry rock geothermal system through a substantial portion of its length extending from a terminal end to its emergence from a central shaft.

In the invention system, the heat recovery fluid partially vaporizes fully or partially at a terminal heat exchanger or along a length of conduit extending from a central shaft. In either case, it is preferred that the injected fluid be contained in an annular space between an outside, uninsulated bore pipe and an internal first pipe. Adjacent to the first internal pipe is a layer of insulation on its inner surface. Adjacent to the insulation is a second internal pipe defining a bore for return of heated heat recovery fluid.

The choice of heat recovery fluid is selected to minimize cost per unit length of installed conduits and installed heat transfer surface required at a terminal end heat exchanger to obtain the objects of economic heat recovery from a geological formation. Pumping energy required for returning condensed and cooled heat recovery fluid from electrical energy production steps to the terminal end heat exchanger by way of the downflow conduit is also minimized.

In a specific example, the heat recovery fluid is selected from one, such as water, which will remain in a liquid state until introduced into a terminal heat exchanger to vaporize at geological formation temperatures of at least 250° C. and thereafter to provide a surface working fluid vapor at 30 to 35 bars at a temperature of from 110° C. to 160° C. It is known in U.S. Pat. No. 4,044,830 to provide a closed loop, geothermal power generation system with multiple conduits extending in a single layer away from a central surface borehole, with each conduit ending in a terminal heat exchanger. However, in the '830 patent the heat transfer medium for use in the terminal heat exchangers is water, which requires a preferred embodiment of a water-containing geological formation for achieving the objects of its invention. U.S. Pat. Nos. 7,225,621 and 4,760,705, which are incorporated herein by reference, disclose a range of hydrocarbon based heat transfer fluids which are directly usable in power generation turbine systems upon vaporization. The above disclosure of requirements of the heat recovery fluid of the invention provides guidance for selection of one or more of the hydrocarbon based heat transfer fluids of the '621 and the '705 patents which will achieve the objects of the invention for heat recovery from a geological formation in a terminal heat exchanger of a closed fluid loop.

The invention geothermal system generally includes surface pressurizing means, such as a centrifugal pump or other means, for pressurizing a liquid stream of the heat recovery fluid, where the pressurized liquid heat recovery fluid is introduced into one or more formation conduits extending from the surface to a terminal heat exchanger in a geological formation. In a preferred embodiment, flow rates of the pressurized liquid heat recovery fluid to each one of the formation conduits is controlled by a control means. Control means comprise means for sensing temperature, pressure and flow rate at each formation conduit, comparing them to calculated desired flow rates for each such formation conduit, and adjusting means for control of flow rates to meet the calculated desired flow rate.

Each such stream of pressurized liquid heat recovery fluid to each formation conduit results in delivery of said stream in liquid state to a terminal heat exchanger located at a desired location in the geological formation. A vapor stream generated by indirect heat transfer with the geological formation is returned by way of the formation conduit to the surface for use in a power generation turbine, to be condensed and delivered to the pressurizing means for re-delivery to the geological formation.

The heat capacity and other thermal properties of the heat transfer fluid are well known, resulting in an ability to calculate to a high degree of precision the amount of heat removed by operation of each formation conduit and terminal heat exchanger.

An object of the invention is to provide a heat recovery fluid which reduces the cost and complexity of a closed loop, hot dry rock heat recovery system for a geological formation at from 4,000 to 10,000 meters depth from the surface.

BRIEF DESCRIPTION OF THE DRAWINGS

FIG. 2 is cutaway side view of a terminal end of a conduit in the heat transfer system in a formation.

FIG. 3 is a section 142 of the conduit of FIG. 2.

FIG. 4 is a top view of a diagram of locations of conduits and terminal heat exchangers in a heat recovery level of the invention system.

DETAILED DESCRIPTION OF THE INVENTION

The invention is now discussed with reference to the figures.

Figure 1:
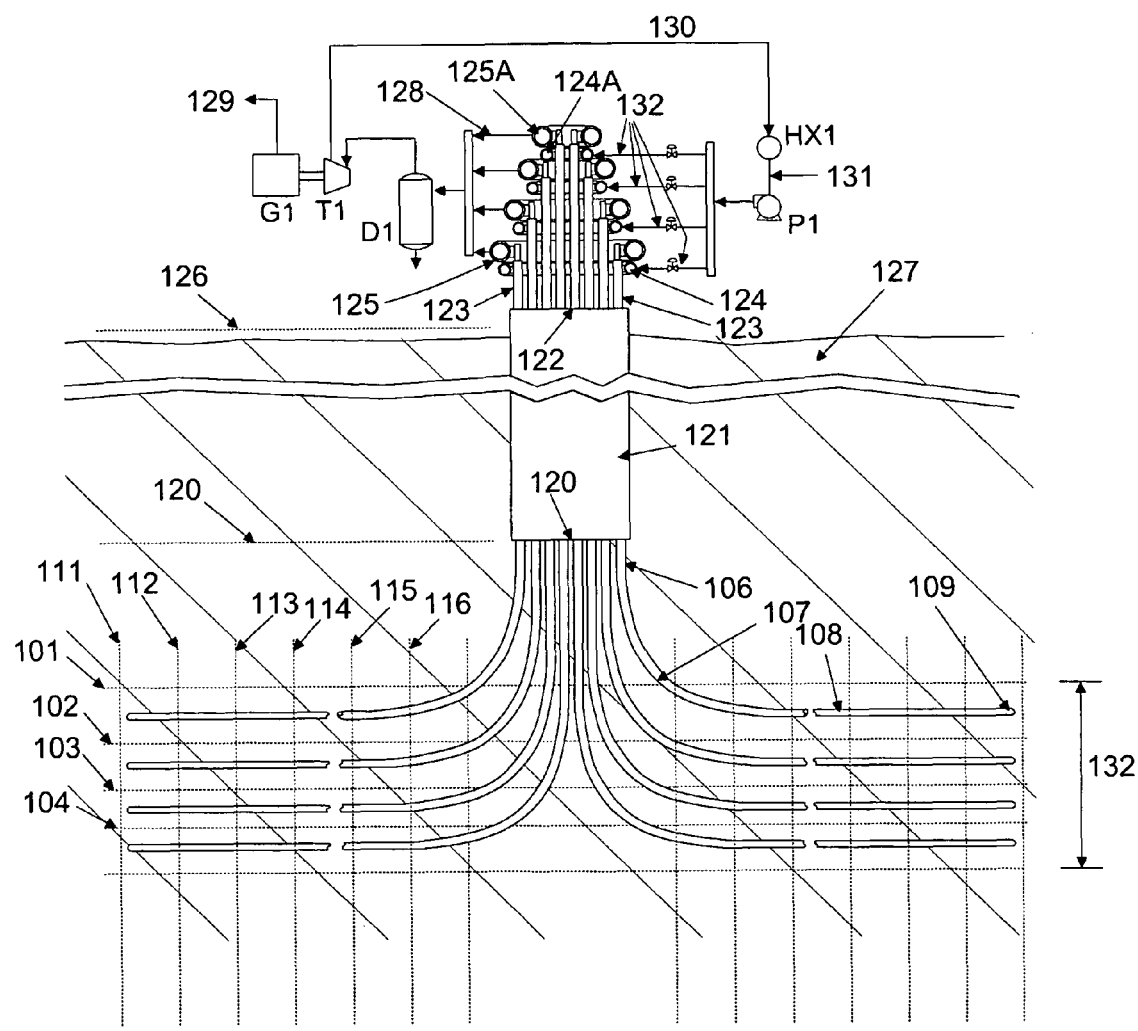
FIG. 1 is a cutaway side view of an invention closed loop heat recovery system installed in a formation with block flow diagrams for process steps for generation of electrical power.

FIG. 1 is a cutaway side view of a formation 127 having drilled into it a cylindrical central shaft 121 extending from a top opening 122 above surface 126 to a lower end 120. The central shaft comprises a metal and cement shell and defines a large diameter bore for protection and direction of individual bore pipes 106 which extend from top ends 123 above top opening 122 through bottom or side (not shown) openings in central shaft 121 to bend sections 107. Bend sections 107 further extend to generally horizontal sections 108 and terminate at terminal ends 109. Four or more bore pipes 106 extend radially and generally horizontally from central shaft 121 defining thereby a top heat recovery level 101, middle heat recovery levels 102 through 103, and bottom heat recovery level 104. Further, each of the heat recovery levels 101 through 104 are divided in defined radial sections 111 through 116. All the heat recovery levels 101 through 105 and radial sections 111 through 116 comprise a heat transfer zone 132 in formation 127. The distance between surface 126 and central shaft depth line 120 is preferably between 2,000 to 9,000 meters to maximize protection of the bore pipes 106 from formation forces, in that severing or puncture of such bore pipes is common in such installations as the invention system. For the invention system, the wall of the central shaft 121 further provides insulation from heat transfer between the bore pipes carrying injection and recovery heat transfer fluids traveling, respectively, to and from the heat recovery zone 132. It will be appreciated from FIG. 1 that heat recovery levels 101 through 105 are effectively adjacent as to their heat transfer capabilities, in that separation of bore pipes of one heat recovery level are sufficiently separated from each other, i.e., 10 to 20 meters or more depending on the average temperature of the level, so that each level experiences a stable average temperature when the invention system is in operation.

FIG. 1 further shows that top ends 123 extend upward for communication with an injection headers 124 and 124A which deliver injection fluid to the bore pipes 106 and receive from them heated vapor from the formation to headers 125 and 125A, which flows in conduits 128 to steam drum D1 for powering turbine T1. Turbine T1 generates power at generator G1. Exhaust steam 130 is condensed in heat exchange HX1 and is pumped at pump P1 to required pressure for re-injection with make-up fluid 131. Control valve lines 132 control individual flows of heat transfer fluids to each of the heat exchange levels 101 through 104. Each control valve is connected with control means for calculation of an average temperature and heat recovery from each of the heat levels 101 through 104 via temperature, pressure and flow sensors for above ground flows of heat transfer fluid into and out of the bore pipes 106 at ground level. Temperature sensors may also be provided at terminal ends of bore pipes 106 so that a local formation temperature can be detected and averaged as an indication of average temperature of a heat recovery level.

FIG. 2 is cutaway side view of a terminal end 109 of a bore pipe 106 in the heat transfer system in a formation, comprising an outer pipe 133 extending to a closed end 139 and a first internal pipe 135, defining between them annular space 134 for passage of injected heat transfer fluid. In one embodiment, an entire length of the outer pipe comprises heat transfer surface from the formation to the injected heat transfer fluid flowing in space 134. This has the effect of reducing heat transfer area required for a terminal end exchanger, if one is required or installed at all.

Further discussing FIG. 2, insulation 136 is located between a second internal pipe 137 and first internal pipe 135 so that vaporized heat transfer fluid entering second internal pipe 137 at opening 143 along path 141 in space 140 will be insulated in its flow in bore 138 of second internal pipe to the surface. FIG. 3 is a section 142 of the conduit of FIG. 2 showing the insulated relationship of annular space 134 from bore 138.

For use of terminal heat exchangers (as they have been described in the prior art), in a heat level of the invention system, FIG. 4 is a top view of a diagram of locations of conduits and terminal heat exchangers 103A through F in radial sections 111 through 116 as described above. Such a set of terminal heat exchangers 103A through F arranged in a substantially radial line from the central shaft 121 provide an equivalent heat transfer surface and recovery to the embodiment described for bore pipes in FIG. 2. For both embodiments, it is intended that heat transfer sub-section 143 (shown in broken lines) comprise heat transfer surfaces for recovery of heat in that pie shaped section. It is an alternate embodiment of the invention to provide separate injection control valves to each of the bore pipes so that heat exchangers 103A through F be provided sequentially with decreasing flows of heat transfer fluid in order to obtain a more uniform average temperature across the heat recovery level 101 in FIG. 4.

Figure 5:
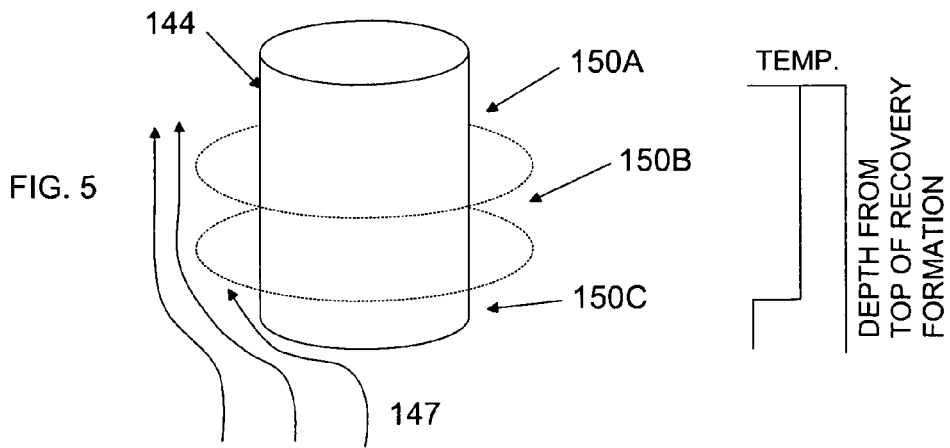
FIGS. 5, 6 and 7 are, respectively, cylinder, an downward frustro-conical section or a upward frustro-conical section heat recovery zones in the invention system.

FIG. 5 shows a cylindrical heat recovery zone 144 divided into three heat recovery levels 150A through C. Formation heat flows 147 impinge with greatest intensity upon level 150C, indicated by a higher average temperature on the graph shown in FIG. 5 than the average temperature of the higher, adjacent heat recovery levels, which are exposed to highest formation temperatures only at the terminal ends of the bore pipes located in that level. Heat recovery fluid flows are necessarily higher in the lower heat recovery level 150C than for the other levels by approximately 10 percent or, more preferably, approximately 20 percent or more.

Figure 6:
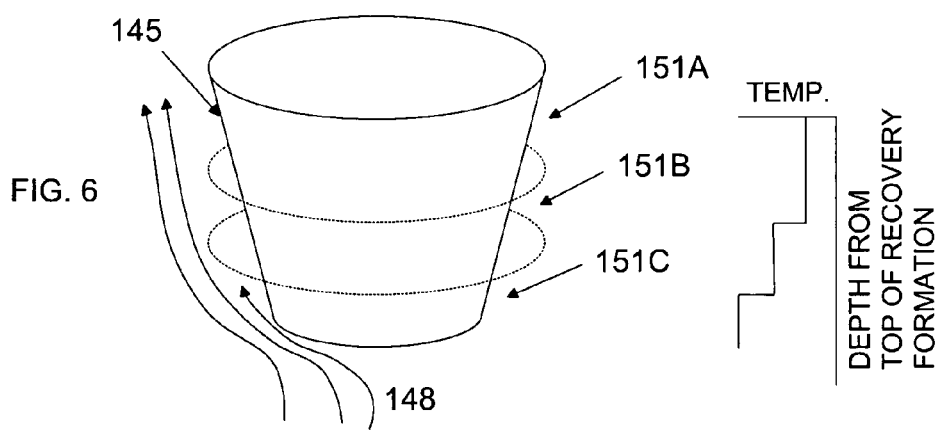

FIG. 6 shows a downward frustro-conical heat recovery zone 145 divided into three heat recovery levels 151A through C. Formation heat flows 148 impinge with greatest intensity upon level 151C, indicated by a higher average temperature on the graph shown in FIG. 6 than the average temperature of the higher, adjacent heat recovery levels. However, the reduced size of level 151C compared with the other levels results in a greater portion of those levels being exposed to the highest formation temperatures. Heat recovery fluid flows are approximately the same to each of the levels 151A through C.

Figure 7:
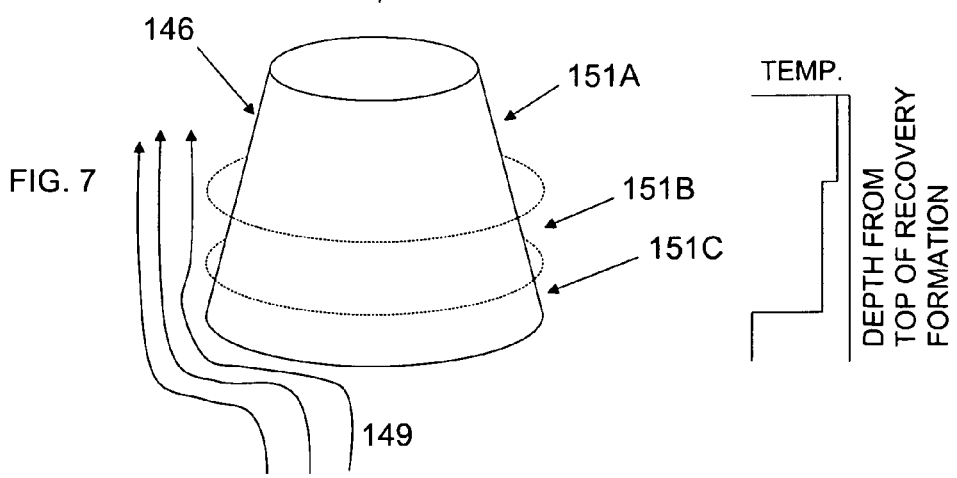

FIG. 7 shows an upward frustro-conical heat recovery zone 146 divided into three heat recovery levels 152A through C. Formation heat flows 149 impinge with greatest intensity upon level 152C, indicated by a higher average temperature on the graph shown in FIG. 7 than the average temperature of the higher, adjacent heat recovery levels. The increased size of level 152C compared with the other levels results in that level absorbing much more heat than the superior levels. Heat recovery fluid flows are necessarily higher in the lower heat recovery level 152C than for the other levels by approximately 30 percent or, more preferably, approximately 50 percent or more.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A closed loop system for heat recovery from two or more heat recovery levels in a geological formation comprising:
    (a) a central shaft extending from a surface level of the formation to more than 2,000 meters below that surface level, where the central shaft comprises a vertical cylindrical shell with insulated walls defining a central bore and an open upper end, having a closed bottom end, and comprising bore openings in the insulated walls or at the bottom end adapted to allow directional drilling means to pass from the central bore to the formation;
    (b) each heat recovery level comprising four or more bores extending radially from the bore openings in the central shaft and each bore containing exposed sections of bore pipes which in turn comprise a bend section, a generally horizontal section, and a terminal section;
    (c) each said bore pipe further extending upward within the central bore to the surface level for connection with a heat transfer fluid injection means and a heat transfer vapor receiving means;
    (d) electrical generation means connected with the heat transfer vapor receiving means, which in turn is connected with the heat transfer fluid injection means; and
    (e) heat transfer means incorporated into one or more said exposed sections for vaporizing a heat transfer fluid injected in liquid form at the heat transfer fluid injection means, transferred to heat transfer vapor receiving means, used for generation of electricity at the electrical generation means, and returned to the heat transfer fluid injection means.

2. The system of claim 1 wherein average temperature sensing and calculation means are adapted to calculate an average temperature of each of the heat recovery levels during operation of said system.

3. The system of claim 2 wherein average temperature sensing and calculation means reduces heat transfer fluid flows to a heat transfer level if an average temperature for that heat transfer level drops below a predetermined level.

4. The system of claim 1 wherein average temperature sensing and calculation means are adapted to calculate heat recovery of each of the heat recovery levels during operation of said system.

5. The system of claim 4 wherein average temperature sensing and calculation means reduces heat transfer fluid flows to a heat transfer level if heat recovery for said heat transfer level drops below a predetermined level.

6. The system of claim 1 wherein heat transfer means consists of a terminal heat exchanger located at said terminal section.

7. The system of claim 6 wherein said terminal heat exchanger provides for heat exchanger flow tubes spiral wound around an outside surface of the bore pipe.

8. The system of claim 1 wherein each bore pipe comprises an outer pipe defining a first bore extending to a closed end at the terminal section and having sealed fluid connection with the heat transfer fluid injection means at another end, a first internal pipe within the first bore defining between them an annular space for passage of injected heat transfer fluid, a second internal pipe defining a second bore for passage of vaporized heat transfer fluid from fluid connection with the annular space at one end and sealed fluid connection with the heat transfer vapor receiving means at another end, where the first internal pipe defines an annular bore within which the second internal pipe is contained and insulation is located in a space between the first and second internal pipes.

9. The system of claim 8 wherein heat transfer means consists of a terminal heat exchanger located at said terminal section defining a fluid connection between the annular space and the second bore for transfer of heat from the formation to the heat transfer fluid.

10. The system of claim 8 wherein heat transfer means comprise said one or more exposed sections of said outer pipe through which heat is absorbed to heat transfer fluid within said annular space.

11. The system of claim 10 wherein heat transfer means consists of all exposed sections.

12. The system of claim 11 wherein heat transfer means consists of the terminal section.

13. The system of claim 8 wherein heat transfer means consists of the terminal section and generally horizontal section.

14. The system of claim 1 wherein heat transfer means consists of a terminal heat exchanger located evenly spaced intervals along radial lines in a heat recovery section.

15. The system of claim 14 wherein heat transfer fluid flow to terminal heat exchangers is less at radially distal terminal heat exchangers than to radially proximal heat exchangers.

* * * * *